(12) United States Patent
Minagata et al.

(10) Patent No.: US 9,583,743 B2
(45) Date of Patent: Feb. 28, 2017

(54) ELECTRICAL STORAGE DEVICE

(71) Applicant: KABUSHIKI KAISHA TOYOTA JIDOSHOKKI, Kariya-shi, Aichi-ken (JP)

(72) Inventors: Atsushi Minagata, Kariya (JP); Motoaki Okuda, Kariya (JP); Hiroyasu Nishihara, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 39 days.

(21) Appl. No.: 14/425,067

(22) PCT Filed: Aug. 23, 2013

(86) PCT No.: PCT/JP2013/072560
§ 371 (c)(1),
(2) Date: Mar. 2, 2015

(87) PCT Pub. No.: WO2014/041988
PCT Pub. Date: Mar. 20, 2014

(65) Prior Publication Data
US 2015/0228939 A1 Aug. 13, 2015

(30) Foreign Application Priority Data

Sep. 12, 2012 (JP) .................... 2012-200582
Sep. 14, 2012 (JP) .................... 2012-202940

(51) Int. Cl.
*H01M 2/06* (2006.01)
*H01M 2/08* (2006.01)
(Continued)

(52) U.S. Cl.
CPC ............. *H01M 2/06* (2013.01); *H01G 11/76* (2013.01); *H01G 11/78* (2013.01); *H01G 11/82* (2013.01);
(Continued)

(58) Field of Classification Search
None
See application file for complete search history.

(56) References Cited

U.S. PATENT DOCUMENTS 5,834,134 A 11/1998 Hooke
5,856,041 A 1/1999 Inoue et al.
(Continued)

FOREIGN PATENT DOCUMENTS

JP 57-126163 U 8/1982
JP 60-68552 A 4/1985
(Continued)

OTHER PUBLICATIONS

International Search Report of PCT/JP2013/072560, dated Oct. 15, 2013. [PCT/ISA/210].
(Continued)

*Primary Examiner* — Patrick Ryan
*Assistant Examiner* — Wyatt McConnell
(74) *Attorney, Agent, or Firm* — Sughrue Mion, PLLC (57) ABSTRACT

An electrical storage device includes a case body having an opening, a lid, which closes the opening and has a through hole, an electrode assembly accommodated in the case body, and an electrode terminal. The electrode terminal has a base and a polar column portion, which projects from the base and shaped to pass from the inside of the case body through the through hole and protrude to the outside. A sealing member is sandwiched between the inner surface of the lid and a seat surface of the base. In a root portion of the polar column portion coupled to the base, in at least a part of the polar column portion around an axis thereof, a tapered portion, which spreads in the cross-sectional shape toward the base along the axis of the polar column portion, is provided. The sealing member is arranged radially outside of the tapered portion.

5 Claims, 6 Drawing Sheets (51) Int. Cl.
*H01G 11/76* (2013.01)
*H01G 11/78* (2013.01)
*H01G 11/82* (2013.01)
*H01M 2/04* (2006.01)
*H01M 2/30* (2006.01)
*H01G 9/10* (2006.01)
*H01M 2/02* (2006.01)

(52) U.S. Cl.
CPC ............ *H01M 2/043* (2013.01); *H01M 2/08* (2013.01); *H01M 2/305* (2013.01); *H01G 9/10* (2013.01); *H01M 2/0237* (2013.01); *H01M 2/0473* (2013.01); *H01M 2220/20* (2013.01); *Y02E 60/13* (2013.01); *Y02T 10/7022* (2013.01)

(56) References Cited

U.S. PATENT DOCUMENTS 6,521,374 B1  2/2003  Nakanishi et al.
2011/0183195 A1  7/2011  Nngai
2011/0294001 A1  12/2011  Byun et al.
2013/0130100 A1  5/2013  Kurata et al.

FOREIGN PATENT DOCUMENTS

| | | |
|---|---|---|
| JP | 9-115500 A | 5/1997 |
| JP | 2000-149915 A | 5/2000 |
| JP | 2002-75301 A | 3/2002 |
| JP | 2004-253295 A | 9/2004 |
| JP | 2006-236790 A | 9/2006 |
| JP | 2009-110687 A | 5/2009 |
| JP | 2009-134985 A | 6/2009 |
| JP | 2009-264845 A | 11/2009 |
| JP | 2010-15784 A | 1/2010 |
| JP | 2012-99253 A | 5/2012 |
| WO | 2010/134155 A1 | 11/2010 |
| WO | 2012/011470 A1 | 1/2012 |

OTHER PUBLICATIONS

International Preliminary Report on Patentabiliy dated Mar. 17, 2015, issued by the International Bureau of WIPO in counterpart International application No. PCT/JP2013/072560.

ELECTRICAL STORAGE DEVICE

CROSS REFERENCE TO RELATED APPLICATIONS

This application is a National Stage of International Application No. PCT/JP2013/072560 filed Aug. 23, 2013, claiming priority based on Japanese Patent Application Nos. 2012-200582, filed Sep. 12, 2012, and 2012-202940, filed Sep. 14, 2012, the contents of all of which are incorporated herein by reference in their entirety.

FIELD OF THE INVENTION

The present invention relates to an electrical storage device that includes an annular sealing member and an electrode terminal electrically connected to an electrode assembly. The electrode terminal includes a base and a polar column portion, which projects from the base and shaped to pass from the inside of a case body through a through hole and protrude to the outside. The sealing member is sandwiched between the inner surface of a lid, which faces the case body, and a seat surface of the base, which faces the inner surface.

BACKGROUND ART OF THE INVENTION

A vehicle such as an electric vehicle (EV) and a plug-in hybrid vehicle (PHV) is equipped with a rechargeable battery as an electrical storage device that stores a power supply to a motor for running the vehicle. Some rechargeable batteries have a case that accommodates an electrode assembly. The case includes a case body and a lid welded to the case body. An electrode terminal is electrically connected to the electrode assembly accommodated in the case body. The electrode terminal is shaped to pass from the inside of the case body through a through hole in the lid and protrude to the outside. An insulating distance is ensured between the inner circumferential surface of the through hole and the outer circumferential surface of the electrode terminal, which faces the inner circumferential surface. A sealing structure of a gap is provided in the rechargeable battery. For example, refer to Patent Document 1.

Figure 10:
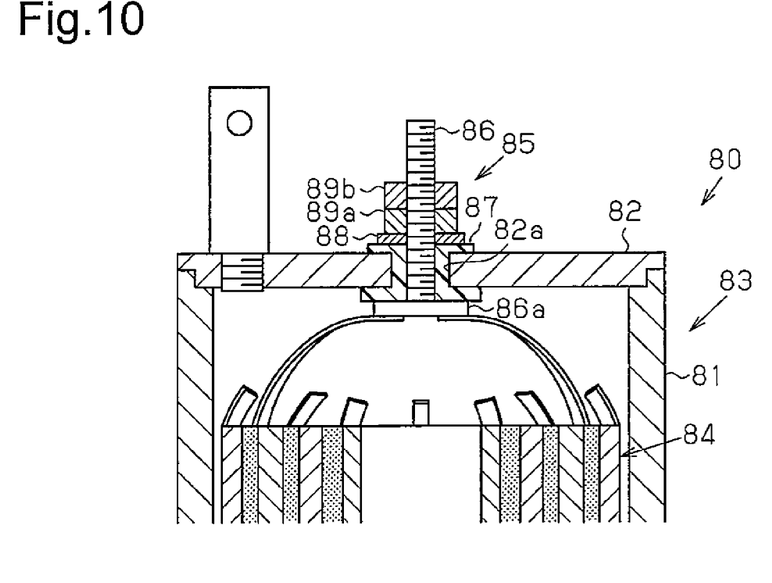
FIG. 10 is a diagram illustrating a prior art of Patent Document 1.

As shown in FIG. 10, a battery 80 of Patent Document 1 is configured such that an exterior can 83 formed by welding a lid body 82 on each end of a cylindrical body 81 accommodates a winding electrode body 84. An electrode terminal mechanism 85 is attached to the lid body 82, and the winding electrode body 84 and the electrode terminal mechanism 85 are connected to each other.

The electrode terminal mechanism 85 includes a positive electrode extending terminal 86 formed of a screw member attached through the lid body 82 of the exterior can 83. The basal end of the positive electrode extending terminal 86 includes a flange portion 86a. An insulating member 87 made of plastic is provided in a gap between the inner circumferential surface of the through hole 82a and the outer circumferential surface of the positive electrode extending terminal 86. The insulating member 87 ensures a sealing property and an electrically insulating property between the lid body 82 and the positive electrode extending terminal 86. A washer 88 fits from the outside of the exterior can 83 onto the positive electrode extending terminal 86, and a first nut 89a and a second nut 89b are threaded to the positive electrode extending terminal 86. The first nut 89a is threaded and the insulating member 87 is located and pressed between the flange portion 86a of the positive electrode extending terminal 86 and the washer 88. This improves the sealing property of the through hole 82a.

However, in the battery 80 of Patent Document 1, to ensure the sealing property of the through hole 82a, it is necessary to swage the insulating member 87 having a complicated shape and bring the complex surface into close contact with the circumference of the through hole 82a. Since the shape of the insulating member 87 is complicated and the installation of the insulating member 87 is troublesome, the formation of the sealing structure is also troublesome. Patent Document 2 discloses that an O-ring with a simple structure is employed as a sealing member.

Figure 11:
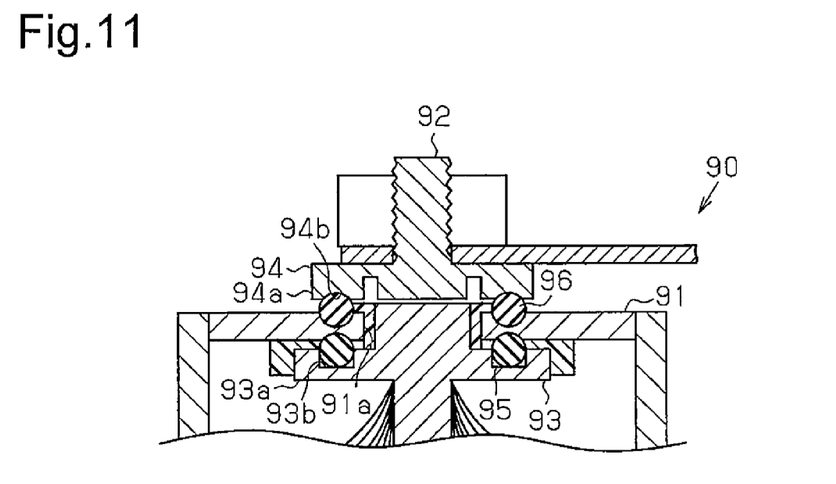
FIG. 11 is a diagram illustrating a prior art of Patent Document 2.

As shown in FIG. 11, in a sealed type battery 90 in Patent Document 2, a lid body 91 includes a terminal drawing hole 91a. A positive electrode terminal 92 attached to the terminal drawing hole 91a includes an inner member 93 and an outer member 94. Sealing member compression portions 93a and 94a of the inner member 93 and the outer member 94 include annular grooves 93b and 94b, respectively. Sealing members 95 and 96 configured by O-rings are mounted on the corresponding annular grooves 93b and 94b. The inner member 93 and the outer member 94 are welded to each other. This locates the sealing member 95 between the lid body 91 and the sealing member compression portion 93a and the sealing member 96 between the lid body 91 and the sealing member compression portion 94a in the compressed manner.

PRIOR ART DOCUMENTS

Patent Documents

Patent Document 1: Japanese Laid-Open Patent Publication No. 2000-149915
Patent Document 2: Japanese Laid-Open Patent Publication No. 2009-134985

SUMMARY OF THE INVENTION

In Patent Document 2, the inner member 93 and the outer member 94 may be welded to each other in a state in which the sealing member 95 fails to be correctly mounted on the annular groove 93b and a circumferential part of the sealing member 95 is on the inner step of the annular groove 93b and displaced to the terminal drawing hole 91a. This may break the sealing member 95, or reduce the sealing property due to a failure of adhering between the sealing member 95 and the lid body 91 or between the sealing member 95 and the sealing member compression portion 93a.

An objective of the present invention is to provide an electrical storage device that easily locates a sealing member in a position in which the sealing member exhibits a sealing property.

In order to achieve the above described objective, an electrical storage device includes: a case body, which has an opening; a lid, which closes the opening and has a through hole; an electrode assembly accommodated in the case body; an electrode terminal; an annular sealing member; and a tapered portion. The electrode terminal passes through the through hole and is electrically connected to the electrode assembly. The electrode terminal includes a base, which is located in the case body and has a cross-sectional area that is greater than an area of the through hole, and a polar column portion, which projects from the base and is shaped to pass from an inside of the case body through the through hole and protrude to an outside. The annular sealing member is sandwiched between an inner surface of the lid, which faces the case body, and a seat surface of the base, which faces the inner surface. The tapered portion is provided in at least a root portion coupled to the base of the polar column portion in at least a part of the polar column portion around an axis of the polar column portion. The tapered portion spreads in a cross-sectional shape toward the base along the axis of the polar column portion. The sealing member is arranged radially outside at a position of the tapered portion.

DETAILED DESCRIPTION OF THE PREFERRED EMBODIMENTS

Hereinafter, an electrical storage device according to one embodiment will be described with reference to FIGS. 1 to 9.

Figure 1:
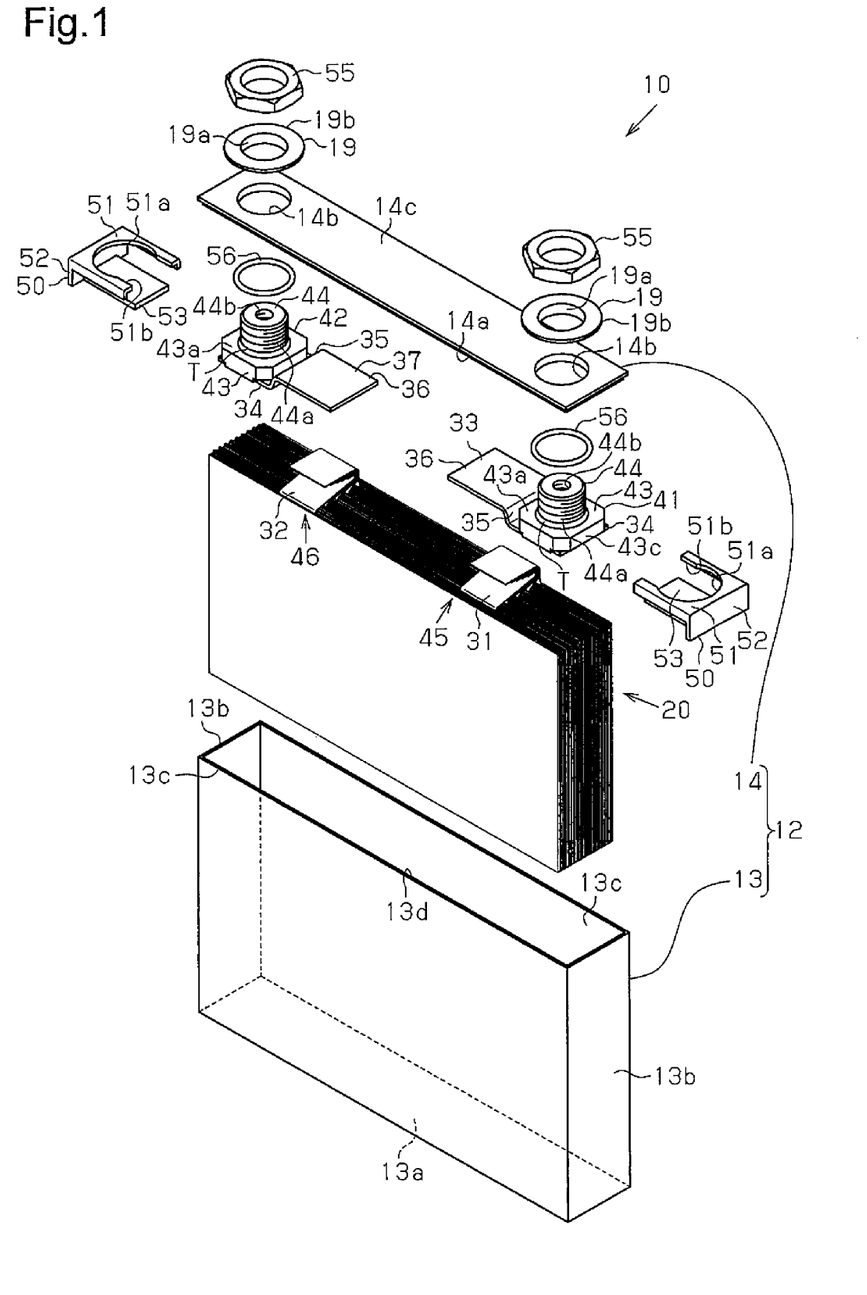
FIG. 1 is an exploded perspective view illustrating a rechargeable battery according to an embodiment.
Figure 2:
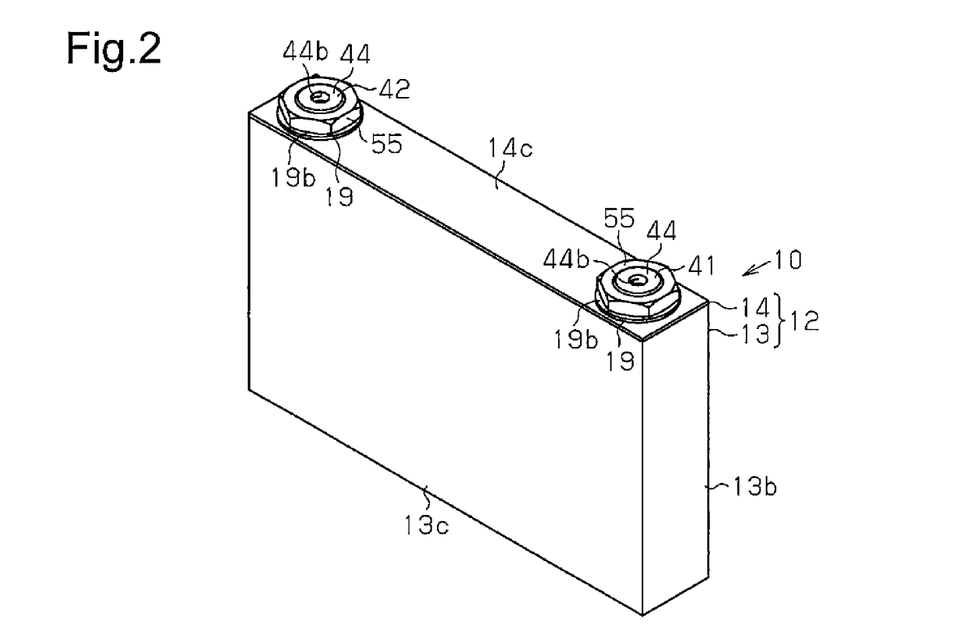
FIG. 2 is a perspective view illustrating an appearance of the rechargeable battery according to the embodiment.
Figure 3:
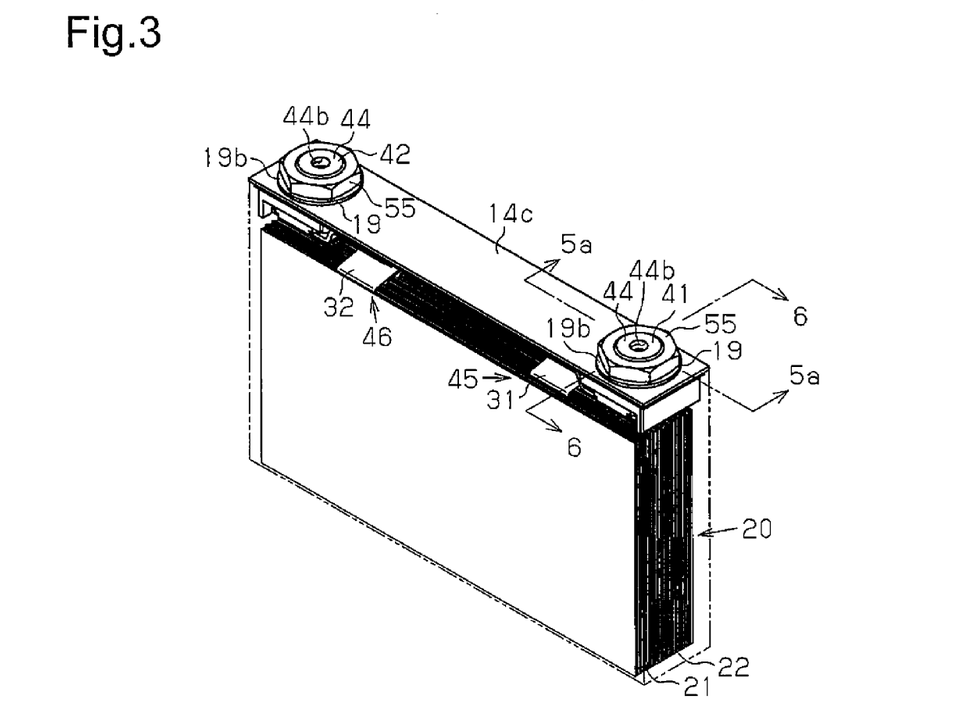
FIG. 3 is a perspective view illustrating a state in which a lid is formed integrally with an electrode assembly.

As shown in FIGS. 1 to 3, in a rechargeable battery 10 as an electrical storage device, a metal case 12 accommodates an electrode assembly 20. The case 12 includes a box-like case body 13 having an opening 13d and a rectangular flat plate-like lid 14, which closes the opening 13d of the case body 13. The case body 13 and the lid 14 are formed of metal (e.g., stainless and aluminum). The lid 14 is joined to the case body 13 by laser welding. The case body 13 includes a rectangular base plate 13a, two short-side walls 13b, which project from two opposing short sides of the base plate 13a, and two long-side walls 13c, which project from two opposing long sides of the base plate 13a. The rechargeable battery 10 according to the present embodiment is a rectangular battery having a rectangular profile. The rechargeable battery 10 according to the present embodiment is a lithium ion battery.

Figure 6:
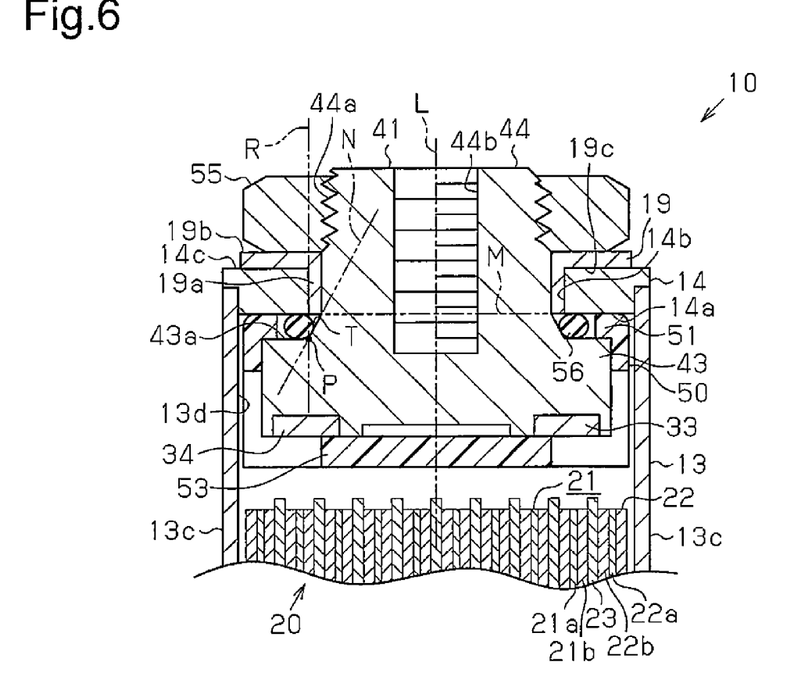
FIG. 6 is a cross-sectional view taken along line 6-6 of FIG. 3, illustrating the insulating structure of the positive electrode terminal.

As shown in FIG. 6, the electrode assembly 20 includes a plurality of positive electrodes 21 and a plurality of negative electrodes 22. The electrode assembly 20 has a stacked body in which a separator 23 is located between each adjacent pair of the positive electrodes 21 and negative electrodes 22. Each separator 23 insulates the corresponding positive electrode 21 and negative electrode 22 from each other. Each positive electrode 21 includes a rectangular positive electrode metal foil (in the present embodiment, aluminum foil) 21a and positive electrode active material layers 21b on the surfaces of the positive electrode metal foil 21a. Each negative electrode 22 includes a rectangular negative electrode metal foil (in the present embodiment, copper foil) 22a and negative electrode active material layers 22b on the surfaces of the negative electrode metal foil 22a.

As shown in FIG. 1, a positive electrode collector tab 31, which is shaped to protrude, is provided on a part of a side of each positive electrode 21. The positive electrode collector tabs 31 are arranged at the same position of the corresponding positive electrodes 21, which configure the electrode assembly 20, and have the same shape. A negative electrode collector tab 32, which is shaped to protrude, is provided on a part of a side of each negative electrode 22. The negative electrode collector tabs 32 are arranged at the same position of the corresponding negative electrodes 22, which configure the electrode assembly 20 and have the same shape.

The positive electrode collector tabs 31 are stacked such that the positive electrode collector tabs 31 are aligned in the stacking direction. In the same manner, the negative electrode collector tabs 32 are stacked such that the negative electrode collector tabs 32 are aligned in the stacking direction without overlapping the positive electrode collector tabs 31. A plurality of the positive electrode collector tabs 31 are bundled in the range from one end to the other end of the electrode assembly 20 in the stacking direction. Also, a plurality of the negative electrode collector tabs 32 are bundled in the range from one end to the other end of the electrode assembly 20 in the stacking direction in the same manner.

The electrode assembly 20 includes a positive electrode tab groups 45 configured by bundling the positive electrode collector tabs 31. The positive electrode tab groups 45 are welded to a positive electrode conductive member 33. The electrode assembly 20 includes a negative electrode tab groups 46 configured by bundling the negative electrode collector tabs 32. The negative electrode tab groups 46 are welded to a negative electrode conductive member 37.

The positive electrode conductive member 33 and the negative electrode conductive member 37 each include a rectangular plate-like terminal connecting portion 34. The positive electrode conductive member 33 and the negative electrode conductive member 37 each include a projecting portion 35, which projects from the terminal connecting portion 34, and a tab welding portion 36, which extends from the projecting portion 35 in a direction that away from the terminal connecting portion 34. Each tab welding portion 36 is rectangular plate-like. The tab welding portion 36 of the positive electrode conductive member 33 is welded to the positive electrode tab groups 45 of the electrode assembly 20, and the tab welding portion 36 of the negative electrode conductive member 37 is welded to the negative electrode tab groups 46 of the electrode assembly 20.

A positive electrode terminal 41 as an electrode terminal is welded to the terminal connecting portion 34 of the positive electrode conductive member 33, and a negative electrode terminal 42 as an electrode terminal is welded to the terminal connecting portion 34 of the negative electrode conductive member 37. The positive electrode terminal 41 and the negative electrode terminal 42 each include a rectangular plate-like base 43. A cylindrical polar column portion 44 projects from the center of each base 43. A seat surface 43a of each base 43, which faces the lid 14, surrounds the corresponding polar column portion 44 when each of the positive electrode terminal 41 and the negative electrode terminal 42 is viewed from the tip end of the corresponding polar column portion 44. Each polar column portion 44 includes an external thread 44a on the outer circumferential surface and an internal thread 44b in the inner circumferential surface.

Figure 5:
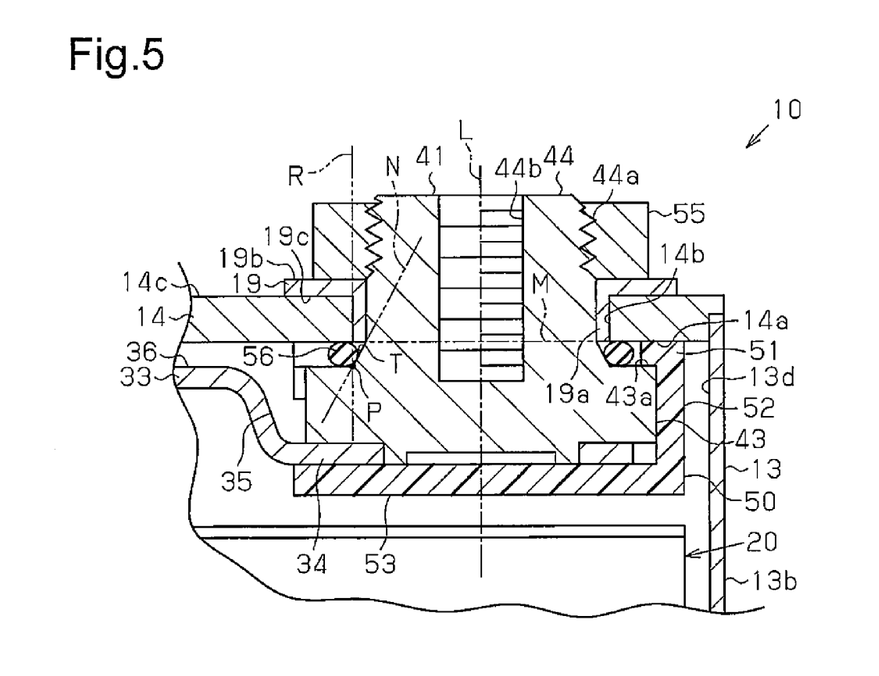
FIG. 5 is a cross-sectional view taken along line 5a-5a of FIG. 3, illustrating an insulating structure of the positive electrode terminal.

As shown in FIGS. 5 and 6, each polar column portion 44 includes a tapered portion T on its root portion connected to the corresponding base 43. Each tapered portion T has a shape such that the diameter of the corresponding polar column portion 44 is increased toward the base 43 along the axis L of the polar column portion 44. Each tapered portion T is tapered such that the cross-sectional shape along the axis L linearly spreads toward the base 43. If a straight line that passes through the inner surface 14a, which faces the case body 13, is shown by an imaginary line M in the lid 14, the tapered portion T is positioned in the case body 13 with a diameter increased from the imaginary line M. The cross-sectional shape of each polar column portion 44 along the axis L is shaped such that the surface of the tapered portion T is linearly inclined from the polar column portion 44 to the base 43. If a point at which the imaginary line N that passes through the surface of the tapered portion T reaches the seat surface 43a of the base 43 is defined as point P, the point P is positioned on a reference line R that passes the inner circumferential surface of the through hole 14b in the thickness direction of the lid 14.

As shown in FIG. 1, an insulating cover 50 made of plastic is mounted on each base 43. Each insulating cover 50 includes an upper insulating plate 51 sandwiched between the seat surface 43a of the corresponding base 43 and the inner surface 14a of the lid 14. Each upper insulating plate 51 electrically insulates the lid 14 from the corresponding positive electrode terminal 41 and negative electrode terminal 42. Each upper insulating plate 51 includes a through portion 51a, which passes through the upper insulating plate 51 in the thickness direction, through which the corresponding polar column portion 44 passes. Each polar column portion 44 passes through the corresponding through portion 51a. The inner circumferential edge of each upper insulating plate 51 is arcuate. Each upper insulating plates 51 includes a communicating portion 51b configured by cutting into one side of the upper insulating plate 51 such that the through portion 51a opens in the side. The through portion 51a and the communicating portion 51b configure the upper insulating plate 51 U-shaped in a plan view.

Of the end edges of each upper insulating plate 51, from the end edge opposite to the communicating portion 51b across the through portion 51a, a vertical insulating plate 52 extends in a direction that is apart from the lid 14. The vertical insulating plates 52 each electrically insulate the case body 13 from the corresponding positive electrode terminal 41 and negative electrode terminal 42. Each vertical insulating plate 52 is rectangular plate-like and extends in a direction that is perpendicular to the upper insulating plate 51. The extending length of each vertical insulating plate 52 from the upper insulating plate 51 is set greater than the thickness of the corresponding base 43. In each vertical insulating plate 52, a lower insulating plate 53 extends in the same direction as the upper insulating plate 51 from a tip end of the vertical insulating plate 52 apart from the lid 14. The lower insulating plate 53 electrically insulates the electrode assembly 20 from the positive electrode terminal 41 and the negative electrode terminal 42. The vertical insulating plate 52 is rectangular plate-like. The gap between the facing surfaces of the upper insulating plate 51 and the lower insulating plate 53 is set slightly greater than the thickness of the corresponding base 43.

The above configured insulating covers 50 are mounted to the corresponding positive electrode terminal 41 and negative electrode terminal 42 by moving the insulating covers 50 from the short-side walls 13b of the case body 13 in the longitudinal direction of the electrode assembly 20. Each polar column portion 44 passes through the corresponding through portion 51a of the upper insulating plate 51 such that the upper insulating plate 51 surrounds the substantially entire circumferential portion of the tapered portion T of the polar column portion 44. Each upper insulating plate 51 is supported on the corresponding seat surface 43a of the base 43.

Figure 4:
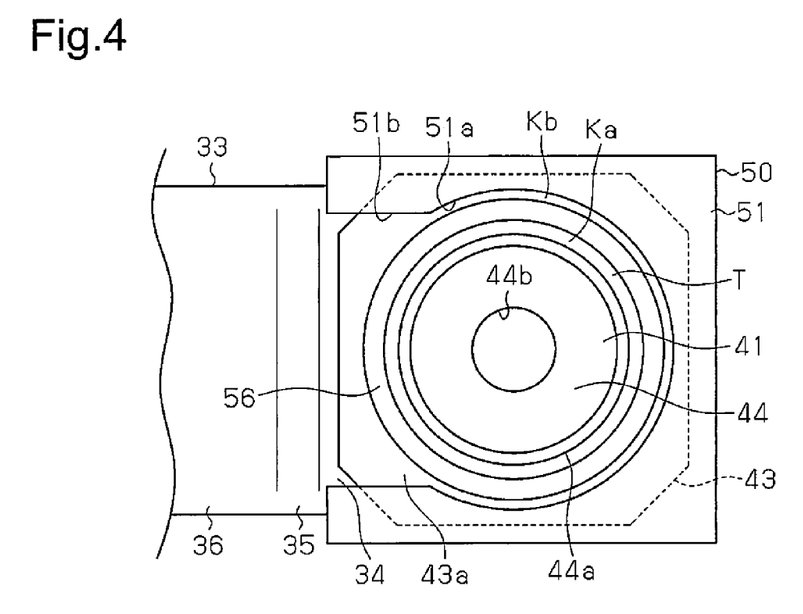
FIG. 4 is a plan view illustrating a positive electrode conductive member, a positive electrode terminal, and an insulating cover.

As shown in FIGS. 4 and 5, on the seat surface 43a of each base 43, an O-ring 56 as a sealing member is provided to surround the tapered portion T of the polar column portion 44. The O-ring 56 is annular with a circular cross section. The O-ring 56 is formed of rubber materials. In the O-ring 56, a surface positioned radially inside of the O-ring 56 is defined as an inner circumferential surface, and a surface positioned radially outside of the O-ring 56 is defined as an outer circumferential surface. In the O-ring 56, the radially outer portion is positioned outside of a reference line R and the entire lower inner circumferential surface contacts the tapered portion T. The O-ring 56 is arranged radially outside at the position of the tapered portion T. The O-ring 56 is arranged inside the through portion 51a of the upper insulating plate 51 in the radial direction of the polar column portion 44 and the substantially entire circumference of the O-ring 56 is surrounded by the upper insulating plate 51. That is, the O-ring 56 is surrounded by the inner circumferential edge of the upper insulating plate 51 other than the portion facing the communicating portion 51b.

The O-ring 56 concentrically surrounds the polar column portion 44. In the state where a part of the inner circumferential surface of the O-ring 56 that is in the vicinity of the base 43, i.e., the lower portion contacts the tapered portion T, a gap Ka is created between the outer circumferential surface of the polar column portion 44 and a part of the inner circumferential surface of the O-ring 56 that faces the lid 14, i.e., the upper portion. Further, in the state where the O-ring 56 concentrically surrounds the polar column portion 44 as a center, a gap Kb is created between the outer circumferential surface of the O-ring 56 and the inner circumferential edge of the upper insulating plate 51. The gap Kb is set narrower than the gap Ka between the upper portion and the polar column portion 44.

As shown in FIGS. 5 and 6, the polar column portion 44, which passes through the through portion 51a of the upper insulating plate 51, is shaped such that the polar column portion 44 passes from the inside of the case body 13 through the through hole 14b formed in the lid 14 and protrudes (is exposed) to the outside. The bases 43 of the positive electrode terminal 41 and negative electrode terminal 42 are each arranged in the case body 13. The cross-sectional area of each base 43, which is perpendicular to the axis L of the polar column portion 44, along the seat surface 43a is set greater than the area of the through hole 14b. This prevents the base 43 from passing through the through hole 14b in the inside of the case body 13.

Each terminal insulating member 19 insulates the inner circumferential surface as the inner surface of the through hole 14b from the outer circumferential surface as the side surface of the polar column portion 44. The terminal insulating member 19 includes a cylindrical ring 19a and a flange portion 19b, which extends from an end edge of the ring 19a to the outside. The ring 19a is located between the inner circumferential surface of the through hole 14b and the outer circumferential surface of the polar column portion 44. In the terminal insulating member 19 as viewed in the axial direction of the polar column portion 44, the entire outer circumferential portion of the ring 19a is stacked on the inner circumferential portion of the O-ring 56. The tip end of the ring 19a apart from the flange portion 19b contacts the O-ring 56.

In the flange portion 19b, a surface in which the ring 19a extends is defined as a locked surface 19c, which is locked by the outer surface 14c of the lid 14 to the outside of the through hole 14b. The extending length of the ring 19a from the locked surface 19c is set the same as the thickness of the lid 14. This locates the tip end of the ring 19a on the same plane of the inner surface 14a of the lid 14 such that the tip end of the ring 19a covers a part of the O-ring 56 from above.

A nut 55 is threaded to the polar column portion 44. The flange portion 19b of the terminal insulating member 19 is located between the nut 55 and the outer surface 14c of the lid 14, and the flange portion 19b electrically insulates the lid 14 from the nut 55. The flange portion 19b, the lid 14, and the upper insulating plate 51 are sandwiched between the nut 55 and the base 43, and the polar column portion 44 is screwed to the lid 14. In the screwed state, the O-ring 56 is compressed between the inner surface 14a of the lid 14 and the seat surface 43a of the base 43, closely contacts the inner surface 14a of the lid 14 and the seat surface 43a of the base 43, and surrounds circumference of the through hole 14b to seal the through hole 14b.

Next, operation of the rechargeable battery 10 will be described with a manufacturing method.

First, in the positive electrode conductive member 33 and negative electrode conductive member 37, the base 43 of the positive electrode terminal 41 and the base 43 of the negative electrode terminal 42 are welded to the corresponding terminal connecting portions 34 to integrally and electrically connects the positive electrode conductive member 33 with the positive electrode terminal 41 and integrally and electrically connect the negative electrode conductive member 37 with the negative electrode terminal 42. Next, the tab welding portion 36 of the positive electrode conductive member 33 is welded to the positive electrode tab groups 45 of the electrode assembly 20, and the tab welding portion 36 of the negative electrode conductive member 37 is welded to the negative electrode tab groups 46 of the electrode assembly 20.

Figure 7:
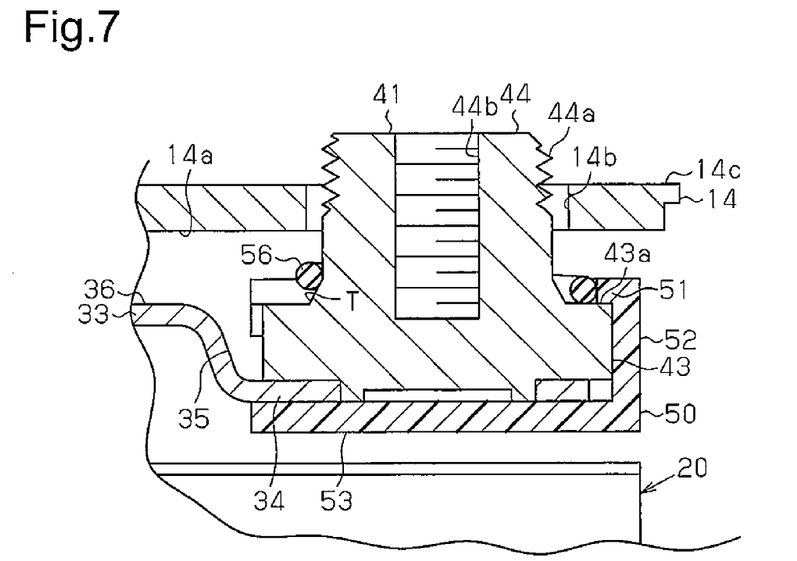
FIG. 7 is a cross-sectional view illustrating an O-ring, which is arranged inclined.

As shown in FIG. 7, the insulating cover 50 is mounted on the positive electrode terminal 41, the seat surface 43a of the base 43 supports the upper insulating plate 51, and the lower insulating plate 53 is located under the base 43. The insulating cover 50 is pushed until the vertical insulating plate 52 contacts the facing base 43. Although not illustrated, the insulating cover 50 is also mounted on the negative electrode terminal 42.

Next, each O-ring 56 is mounted on the corresponding polar column portion 44.

Figure 8:
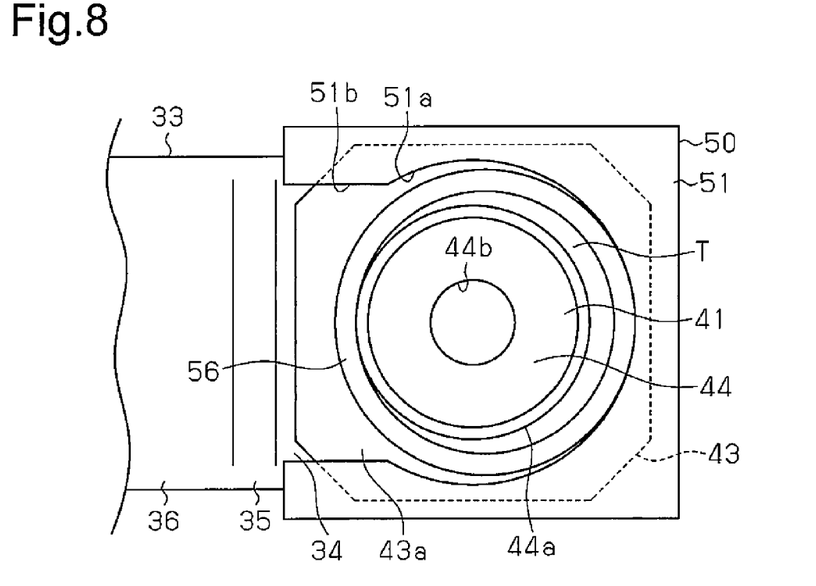
FIG. 8 is a plan view illustrating the O-ring, which is arranged inclined.

As shown in FIGS. 7 and 8, it is assumed that the inner circumferential surface of a circumferential part of the O-ring 56 is on the tapered portion T. In this case, the circumferential part of the O-ring 56 contacts the tapered portion T so that a portion of the O-ring 56 that is radially opposite to the contact portion across the center of the O-ring 56 is apart from the tapered portion T. This brings the O-ring 56 into an inclined state relative to the axis L of the polar column portion 44.

Next, the ring 19a of the terminal insulating member 19 is passed through the through hole 14b of the lid 14 such that the outer surface 14c of the lid 14 locks the flange portion 19b. The lid 14 is attached such that the O-ring 56 is in the inclined state and the polar column portion 44 is passed through the ring 19a in the through hole 14b. At this time, the ring 19a is present between the inner circumferential surface of the through hole 14b and the outer circumferential surface of the polar column portion 44. This prevents the O-ring 56 from being caught between the inner circumferential surface of the through hole 14b and the outer circumferential surface of the polar column portion 44.

Figure 9:
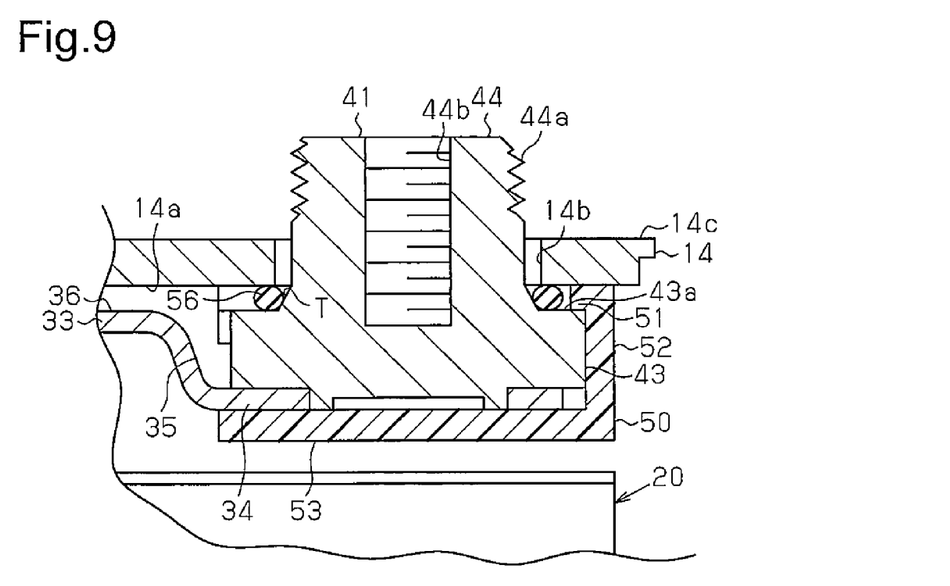
FIG. 9 is a cross-sectional view illustrating the O-ring, which is pressed down by the lid and arranged at a predetermined position.

When the lid 14 is attached, the inner surface 14a of the lid 14 contacts the O-ring 56, and the O-ring 56 is pushed toward the base 43. This moves the O-ring 56 toward the base 43 along the tapered portion T. At this time, the tapered portion T spreads toward the base 43. Accordingly, when the O-ring 56 is along the tapered portion T, a portion of the O-ring 56 that contacts the tapered portion T is guided in the radial direction of the polar column portion 44 and in the direction that is apart from the polar column portion 44, and a portion of the O-ring 56 that is radially opposite to the contact portion across the center of the O-ring 56 is drawn in the radial direction of the polar column portion 44 toward the polar column portion 44. As a result, as shown in FIG. 9, the O-ring 56 is concentrically arranged about the polar column portion 44 and located inward from the upper insulating plate 51.

When the lid 14 is supported by the O-ring 56, the nut 55 is threaded to the external thread 44a of the polar column portion 44. This brings the inner surface 14a of the lid 14 into contact with the upper insulating plate 51 such that the lid pushes the O-ring 56 onto the base 43. At this time, the thickness of the upper insulating plate 51 prevents the O-ring 56 from being excessively pushed by the lid 14. As a result, the O-ring 56 closely contacts the inner surface 14a of the lid 14 and the seat surface 43a of the base 43 and is positioned to surround the circumference of the through hole 14b.

The threading of the nut 55 pushes the flange portion 19b toward the lid 14 so that the ring 19a is pushed toward the terminal insulating member 19. This stacks the ring 19a on the O-ring 56 from above. Then, the case body 13 accommodates the electrode assembly 20, and the lid 14 is welded to the case body 13 to form the case 12. This manufactures the rechargeable battery 10.

The above described embodiment has the following advantages.

(1) The positive electrode terminal 41 and negative electrode terminal 42 are each formed by the base 43 and the polar column portion 44. The polar column portion 44 includes a tapered portion T at its root portion coupled to the base 43. The tapered portion T spreads in the cross-sectional shape toward the base 43. Accordingly, even if the O-ring 56 is on the tapered portion T and shifted relative to the through hole 14b when the O-ring 56 is mounted on the polar column portion 44, the O-ring 56 is moved by the tapered portion T to a position at which the O-ring 56 concentrically surrounds the polar column portion 44. This movement of the O-ring 56 is caused by pushing the O-ring 56 by the lid 14 when the positive electrode terminal 41 and negative electrode terminal 42 are attached to the lid 14. Accordingly, the tapered portion T locates the O-ring 56 at a position in which the O-ring 56 surrounds and seals the circumference of the through hole 14b at the same time of the attaching of the lid 14.

(2) If the lid 14 pushes the O-ring 56 to be located around the tapered portion T, the inner circumferential surface of the O-ring 56 is then brought into contact with the tapered portion T to limit the radial movement of the O-ring 56.

(3) The ring 19a of the terminal insulating member 19, which insulates the polar column portion 44 from the lid 14, is located between the inner circumferential surface of the through hole 14b and the outer circumferential surface of the polar column portion 44. The ring 19a of the terminal insulating member 19 is stacked on the O-ring 56 as viewed in the axial direction of the polar column portion 44. Accordingly, for example, even if the internal pressure in the case 12 is increased and applied to the O-ring 56, the terminal insulating member 19 restricts the O-ring 56 from being raised toward the lid 14. Further, the O-ring 56 is prevented from exiting the case 12 through the gap between the inner circumferential surface of the through hole 14b and the outer circumferential surface of the polar column portion 44.

(4) The tapered portion T is located in the polar column portion 44 of each of the positive electrode terminal 41 and negative electrode terminal 42. This easily locates the O-ring 56 at a position at which the O-ring 56 seals the through hole 14b. Accordingly, even if the O-ring 56 made of rubber as a sealing member with a simple structure is employed, the through hole 14b is ensured to be sealed.

(5) Each tapered portion T is tapered such that the cross-sectional shape linearly spreads toward the base 43. Accordingly, the pushing of the O-ring 56 by the lid 14 smoothly moves the O-ring 56.

(6) The insulating cover 50 is mounted on the base 43 of each of the positive electrode terminal 41 and negative electrode terminal 42. Each polar column portion 44 passes through the corresponding through portion 51a of the upper insulating plate 51. When the O-ring 56 is mounted on the polar column portion 44, the O-ring 56 is arranged inside of the upper insulating plate 51 in the radial direction of the polar column portion 44. When the O-ring 56 is concentrically arranged relative to the polar column portion 44 radially outside of the polar column portion 44, the gap Ka between the inner circumferential edge of the O-ring 56 and the outer circumferential surface of the polar column portion 44 is greater than the gap Kb between the outer circumferential surface of the O-ring 56 and the inner circumferential surface of the upper insulating plate 51. Accordingly, even if the O-ring 56 is radially shifted, the movement of the O-ring 56 is limited until the outer circumferential surface of the O-ring 56 contacts the inner circumferential edge of the upper insulating plate 51 and the inner circumferential surface of the O-ring 56 contacts the polar column portion 44. This brings the O-ring 56 into contact with the tapered portion T. Accordingly, when the lid 14 pushes the O-ring 56, an amount of the movement of the O-ring 56 is reduced.

(7) The upper insulating plate 51 of the insulating cover 50 is located between the lid 14 and the base 43 when the nut 55 is threaded to the external thread 44a of the polar column portion 44. Accordingly, the upper insulating plate 51 serves as a spacer between the lid 14 and the base 43 to limit an excessive threading of the nut 55. Therefore, the upper insulating plate 51 is located to limit the excessive compression of the O-ring 56.

(8) The tapered portion T is formed at a root portion of the polar column portion 44. The tapered portion T concentrically locates the O-ring 56 about the polar column portion 44 radially outside of the polar column portion 44 at a position in which the O-ring 56 surrounds the circumference of the through hole 14b. This limits the contacting of the corner portion of the inner circumferential edge of the through hole 14b to the O-ring 56 when the lid 14 presses the O-ring 56. Since the positive electrode terminal 41 and the negative electrode terminal 42 are attached to the lid 14 in the state in which the terminal insulating member 19 is passed through the through hole 14b of the lid 14, the ring 19a of the terminal insulating member 19 prevents the O-ring 56 from being caught between the inner circumferential surface of the through hole 14b and the outer circumferential surface of the polar column portion 44.

(9) Even if the O-ring 56 is shifted from the through hole 14b, the polar column portion 44 includes the tapered portion T at its root portion so that the O-ring 56 is located at a position at which the O-ring 56 surrounds the circumference of the through hole 14b at the same time of attaching the positive electrode terminal 41 and the negative electrode terminal 42 to the lid 14. Accordingly, it is not necessary to manually correct the position of the O-ring 56. This improves the attaching performance and the productivity of the rechargeable battery 10.

The above described embodiment may be modified as follows.

The insulating cover 50 may be omitted.

According to the embodiment, the tapered portion T has a linearly inclined cross-sectional shape toward the base 43 along the axis L. The cross-sectional shape of the tapered portion T need not be linearly inclined as long as the cross-sectional shape of the polar column portion 44 along the axis L spreads toward the basal end of the polar column portion 44. The tapered portion T may be curved to be arcuate in which the tapered portion T protrudes outward or is recessed inward.

According to the embodiment, the sealing member is embodied by the O-ring 56 with a circular cross-sectional shape. However, the cross-sectional shape is not limited to circular. O-rings with other cross-sectional shapes may be employed.

According to the embodiment, the sealing member is embodied by the O-ring 56. However, a gasket made of plastic may substitute for the O-ring 56.

According to the embodiment, the ring 19a of the terminal insulating member 19 is stacked on the O-ring 56 as viewed in the axial direction of the polar column portion 44. However, the ring 19a need not be stacked on the O-ring 56.

According to the embodiment, the terminal insulating member 19 is formed cylindrical, and the ring 19a is inserted over the entire inner circumferential surface of the through hole 14b and the outer circumferential surface of the polar column portion 44 between the inner circumferential surface of the through hole 14b and the outer circumferential surface of the polar column portion 44. However, the terminal insulating member 19 may be inserted over a circumferential part of the inner circumferential surface of the through hole 14b and the outer circumferential surface of the polar column portion 44 between the inner circumferential surface of the through hole 14b and the outer circumferential surface of the polar column portion 44. The terminal insulating member 19 may be stacked on only a circumferential part of the O-ring 56 as viewed in the axial direction of the polar column portion 44. The ring 19a of the terminal insulating member 19 may be stacked on the entire O-ring 56 viewed in the axial direction of the polar column portion 44.

According to the embodiment, the tapered portion T is formed around the entire circumference of the polar column portion 44. However, the tapered portion T may be formed around only a circumferential part of the polar column portion 44.

The entire polar column portion 44 in the axial direction may be conically shaped such that the entire polar column portion 44 may be the tapered portion T.

The number of the positive electrodes 21 and negative electrodes 22, which configure the electrode assembly 20, may be appropriately changed.

The shape of the case 12 may be cylindrical or elliptic cylindrical.

The present invention may be embodied by a nickel hydrogen rechargeable battery as an electrical storage device or an electric double layer capacitor.

The invention claimed is:

1. An electrical storage device comprising:
    a case body, which has an opening;
    a lid, which closes the opening and has a through hole;
    an electrode assembly accommodated in the case body;
    an electrode terminal, which passes through the through hole and is electrically connected to the electrode assembly, wherein the electrode terminal includes a base, which is located in the case body and has a cross-sectional area that is greater than an area of the through hole, and a polar column portion, which projects from the base and is shaped to pass from an inside of the case body through the through hole and protrude to an outside;
    an annular sealing member sandwiched between an inner surface of the lid, which faces the case body, and a seat surface of the base, which faces the inner surface;
    a tapered portion provided in at least a root portion coupled to the base of the polar column portion in at least a part of the polar column portion around an axis of the polar column portion, wherein
    the tapered portion spreads in a cross-sectional shape toward the base along the axis of the polar column portion, and
    the sealing member is arranged radially outside at a position of the tapered portion; and
    an insulating cover, which insulates the inner surface of the lid from the seat surface of the base, wherein
    the insulating cover includes a through portion for the polar column portion, and
    in a radial direction of the polar column portion, the sealing member is arranged inside of the through portion.

2. The electrical storage device according to claim 1, further comprising a terminal insulating member, which passes between an inner surface of the through hole and a side surface of the polar column portion facing the inner surface, wherein the terminal insulating member is stacked on at least a part of the sealing member as viewed in an axial direction of the polar column portion.

3. The electrical storage device according to claim 1, wherein the sealing member is an O-ring.

4. The electrical storage device according to claim 1, wherein the cross-sectional shape of the tapered portion is tapered such that the cross-sectional shape linearly spreads toward the base.

5. The electrical storage device according to claim 1, wherein the electrical storage device is a rechargeable battery.

* * * * *